United States Patent [19]

Fisher

[11] Patent Number: 4,495,937
[45] Date of Patent: Jan. 29, 1985

[54] THERMAL COLLECTOR AND STORAGE SYSTEM

[75] Inventor: D. Larry Fisher, Harrisonburg, Va.

[73] Assignee: Sunwood Energy Systems, Inc., Harrisonburg, Va.

[21] Appl. No.: 298,295

[22] Filed: Aug. 31, 1981

[51] Int. Cl.³ .................................................. F24J 3/02
[52] U.S. Cl. ..................................... 126/430; 126/400; 126/422
[58] Field of Search ............... 126/432, 429, 430, 436, 126/400, 422, 438, 431

[56] References Cited

U.S. PATENT DOCUMENTS

| | | | |
|---|---|---|---|
| 2,182,222 | 12/1939 | Courtis et al. | 126/424 |
| 2,595,905 | 5/1952 | Telkes | 126/419 |
| 2,857,634 | 10/1958 | Garbade et al. | 126/419 |
| 2,902,028 | 9/1959 | Manly | 126/424 |
| 3,012,294 | 12/1961 | Waldor | 126/429 |
| 3,952,947 | 4/1976 | Saunders | 126/422 |
| 4,002,159 | 1/1977 | Angilletta | 126/429 |
| 4,061,129 | 12/1977 | Wilson | 126/422 |
| 4,095,369 | 6/1978 | Posnansky et al. | 126/438 |
| 4,100,914 | 7/1978 | Williams | 126/429 |
| 4,149,523 | 4/1979 | Boy-Marcotte et al. | 126/425 |
| 4,172,442 | 10/1979 | Boblitz | 126/422 |
| 4,201,195 | 5/1980 | Sakhuja | 126/444 |
| 4,205,661 | 6/1980 | Chapman | 126/425 |
| 4,212,289 | 7/1980 | Hebert | 126/428 |
| 4,223,664 | 9/1980 | Fattor | 126/436 |
| 4,232,731 | 11/1980 | Kaplan | 126/430 |
| 4,290,416 | 9/1981 | Maloney | 126/430 |
| 4,296,734 | 10/1981 | Nevins | 126/449 |
| 4,324,226 | 4/1982 | Beck | 126/430 |
| 4,338,917 | 7/1982 | Keller | 126/429 |
| 4,355,682 | 10/1982 | Maloney | 126/400 |

FOREIGN PATENT DOCUMENTS

| | | | |
|---|---|---|---|
| 46349 | 4/1980 | Japan | 126/428 |
| 7709979 | 3/1979 | Netherlands | 126/430 |

Primary Examiner—James C. Yeung
Attorney, Agent, or Firm—Mason, Fenwick & Lawrence

[57] ABSTRACT

A thermal collector and storage system is described as comprising a plurality of energy storage elements or rods mounted in a parallel array within an enclosure, which is adapted to be readily built into a housing wall. Each such storage rod contains a heat phase transformable medium having a melting temperature sufficiently above that temperature desired to be maintained within the housing to promote efficient transfer thereto. Each rod of the array includes an insulating element that is disposable between a first position wherein solar energy loss to the exterior of the house is retarded, and a second position wherein solar energy may be directed onto the rods.

10 Claims, 7 Drawing Figures

THERMAL COLLECTOR AND STORAGE SYSTEM

DESCRIPTION

Background of Prior Art

The present invention relates to heat collector and storage systems for absorbing, storing solar energy and for controllably releasing the stored energy into a confined enclosure such as a house.

As the public becomes more conscious of the cost and the desire to save energy resources, the popularity of the use of solar energy heat exchanger systems increases. One of the practical drawbacks to the acceptance of such solar heat exchanger systems involves the esthetic appearance of a house with such a system installed thereon. For example, U.S. Pat. No. 4,217,884 discloses the use of a collector box that is mounted upon the roof of a house and includes a plurality of absorber tubes disposed in an array to receive solar energy as reflected from a reflective surface. Such a system would require a suitable mounting structure for the collector box upon the roof of a house, as well as conduits leading from the absorber tubes to a suitable heat storage mechanism. Each of the absorber tubes is provided with a surrounding, overlapping cylindrical baffle comprised of at least two cylindrical portions that functions as an iris diagram to control the reflection of the solar energy from the reflective surface.

A similiar roof top system is disclosed in U.S. Pat. No. 4,223,664, which describes a collector mounted upon a roof having a plurality of conduits disposed within the collector, the collector having an insulating structure tending to surround each set of conduits. A reflector is provided to direct the sun's radiation onto each set of conduits. In addition, an insulating member is hingedly disposed to move from a first position enclosing each set of conduits thus preventing heat loss during off sun times for the heat storage means, to a second position permitting the sun's radiation to be directed from the reflector onto its set of conduits. Both of the above-described heat exchanger systems require means for storing a heat absorbing fluid as passed through the conduits, which may require massive trompe walls, water tanks or the equivalent.

Further, many proposed heat exchanger systems are disposed in window openings, whereby the solar energy may be absorbed and conveniently reradiated into the interior of the house. Windows that face south are typically employed but can result in the overheating of those rooms with the southern exposure. Typically, the windows facing south are left open, whereby the incoming solar energy and light may damage the house's furnishings, i.e. to burn or fade its carpets and furniture. Conversely, during nighttime or in the absence of the sun, such windows must be shielded to prevent excessive heat loss; to this end, insulating panels may be disposed over the window, such panels being relatively expensive and being a nuisance to reposition.

U.S. Pat. No. 4,212,289 discloses a solar shutter or blind that is disposed with respect to a house's existing windows. Such a shutter comprises a horizontal array of overlapping slats or vanes, each vane having a plurality of channels for containing a quantity of phase transformable heat storing medium such as silicone or flurocarbon elastomers. The shutters may be supported by hinges in a conventional fashion, whereby the shutters may be rotated from a first position wherein the windows are exposed and the shutters absorb heat, to a second or closed position covering the windows. Alternatively, such shutters may be disposed upon rails to permit sliding between window blocking and unblocking positions. Further, such shutters are described wherein each of the vanes is mounted to be rotatable to make the heat absorption more efficient.

U.S. Pat. No. 4,144,931 describes a further solar heating system adapted to be disposed in a window and includes an array of vanes, each including a flat reflective surface, an oppositely disposed heat absorbing surface, a tube extending centrally therethrough for receiving a heat exchanger fluid and means for rotating the vane between first and second positions. In the first position, the heat absorbing surface of each vane is disposed to receive the solar energy and in the second position, the flat reflecting surface is disposed outwardly to reflect the solar energy, while the heat absorbing surface is disposed to the interior of the house to permit heat release thereto. Each of the noted vanes is rotated between its first and second positions through an angle of approximately 180°.

BRIEF SUMMARY OF THE INVENTION

It is an object of this invention to provide a new and improved combined collector and storage system that may be disposed within a housing wall in a pleasing, asthetic manner.

It is a still further object of this invention, to permit the selective release of solar energy from the collector and storage system of this invention into the housing, while preventing heat loss to the exterior.

It is a still further object of this invention to provide a new and improved heat collector and storage system that avoids many of the disadvantages of the prior systems— namely, the use of windows, of insulating panels that must be disposed over such windows to prevent heat loss and of cumbersome, expensive and unesthetic heat storage devices.

In accordance with these and other objects of the invention, there is provided a heat collector and storage system comprising a plurality of energy storage elements or rods mounted in a parallel array within an enclosure which is adapted to be readily built into a housing wall. Each such storage rod contains a heat phase transformable medium having a melting temperature sufficiently above that temperature desired to be maintained within the housing to promote efficient transfer thereto. Each rod of the array includes an insulating element that is disposed between a first position, wherein the energy loss from the rods is retarded, and a second position, wherein solar energy may be directed onto the rods.

In a further feature, the insulating elements are so configured that, when they are disposed in their first position, the insulating elements form a continuous insulation layer to retard the loss of heat to the exterior of the house. By contrast, when in their second position, spaces are maintained between the insulating elements to permit heat transfer directly to the conditioned space, e.g. the interior of a house.

In a still further feature of this invention, a fan is provided for drawing air from the interior conditioned space to be directed by openings within a diffuser in a direction perpendicular to the axes of the rods, and from the rods back into the conditioned space. A first temperature sensing element is responsive to the temperature of the solar energy as directed on the rods so that at nighttime or cloudy weather, an actuator associated with the insulating elements may be energized to dispose the insulating elements from their second positions to their first positions. In addition, a second temperature sensing element is disposed to sense the temperature of the conditioned space. The second temperature sensing element is associated with the fan that serves to draw relatively cool air from the conditioned space into the enclosure and about the energy storage rods whereby heat exchange takes place, and subsequently back into the conditioned space. Whenever the temperature of the conditioned space falls below a predetermined level, the fan will be energized to draw air about the rods, regardless of whether the insulating elements are disposed in their first or second positions.

BRIEF DESCRIPTION OF THE DRAWINGS

A detailed description of a preferred embodiment of this invention is made in conjunction with the following drawings in which like references are used in the different figures for illustrating the same elements.

DETAILED DESCRIPTION OF INVENTION

Figure 1:
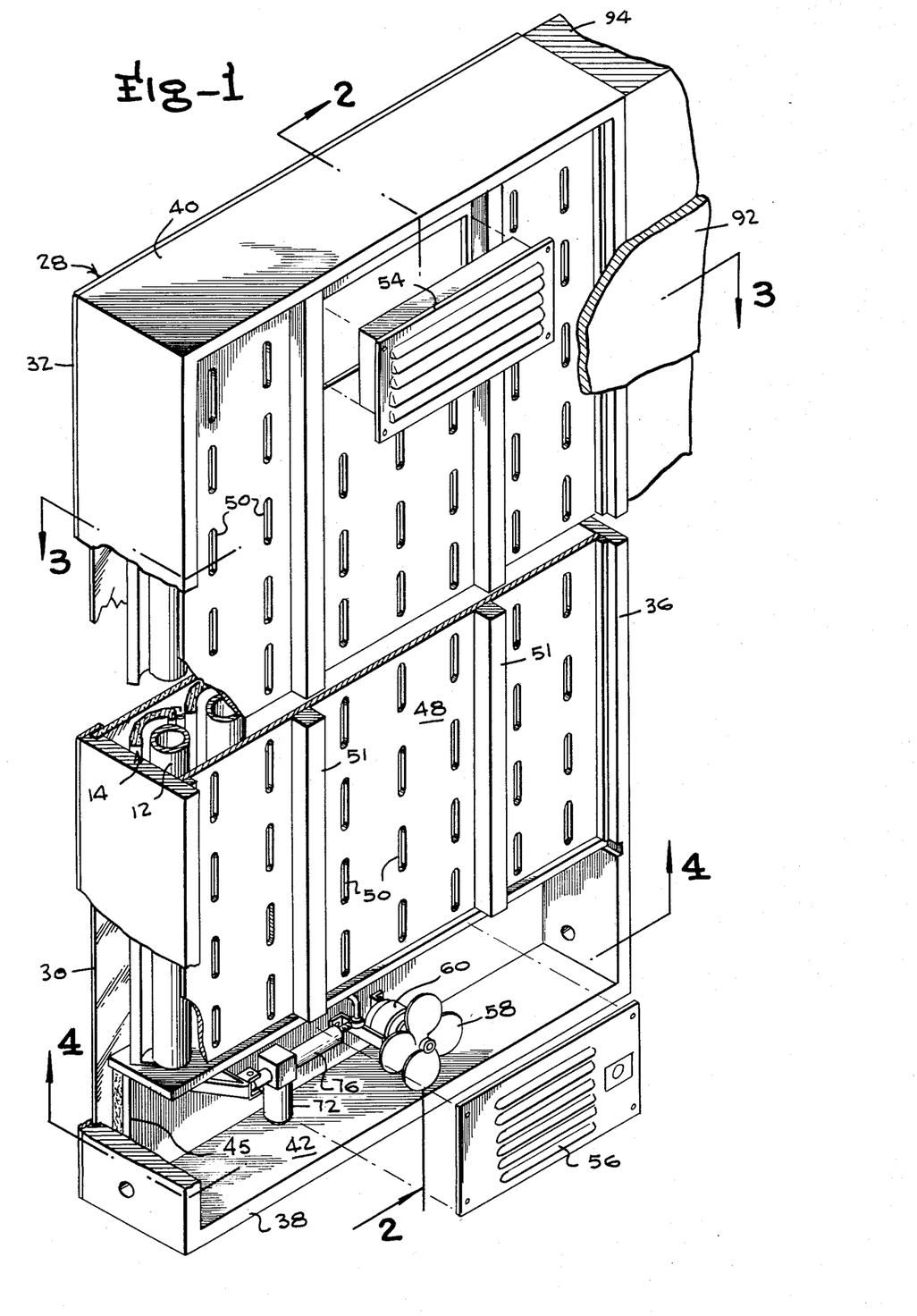
FIG. 1 is a perspective view of the modular collector and storage system in accordance with the teachings of this invention, as would be incorporated into an exterior wall of a building to be conditioned.
Figures 2, 5:
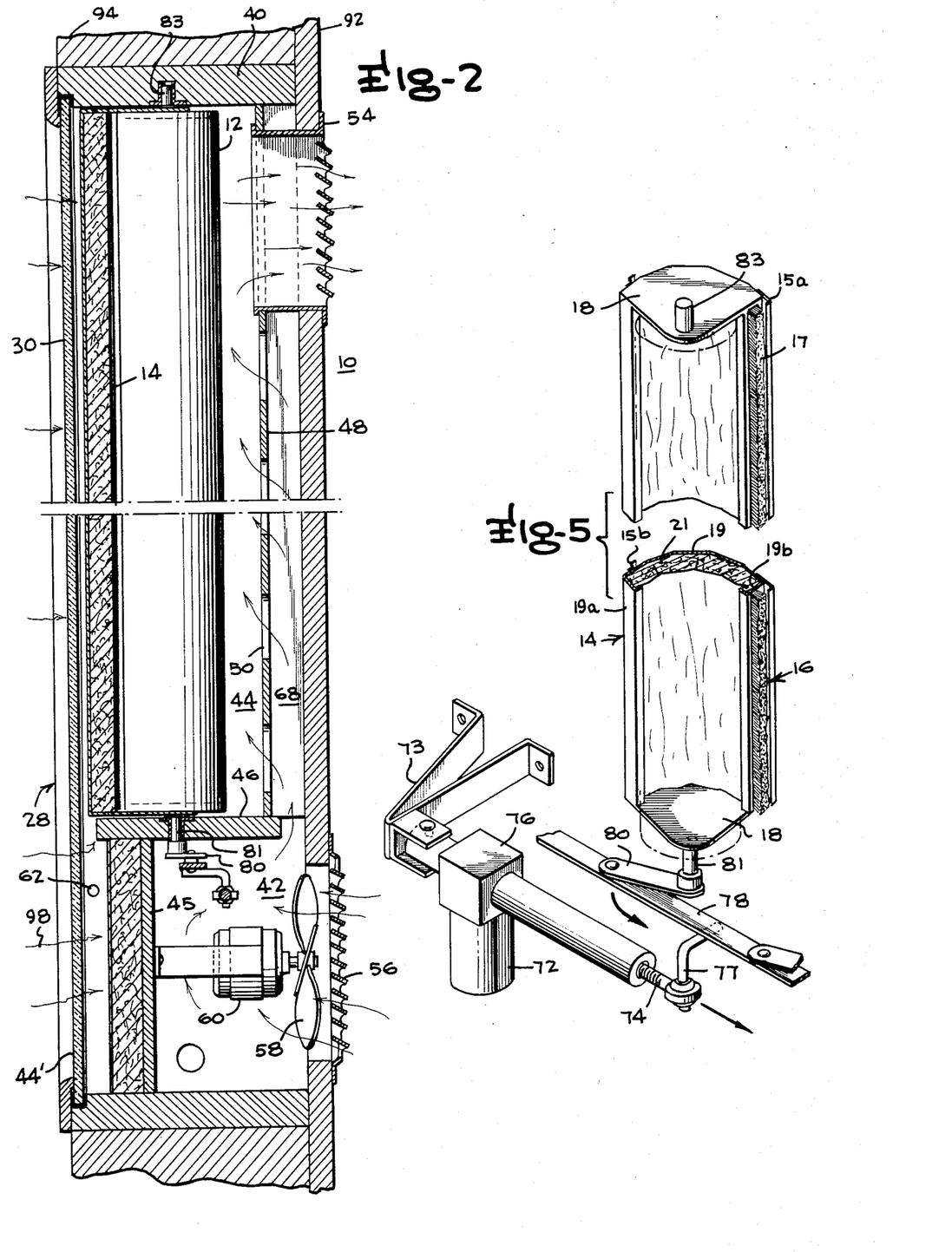
FIG. 2 is a side view of the heat collector and storage system as taken along lines 2—2 as shown in FIG. 1.
FIG. 5 is a perspective view of one of the plurality of energy storage elements or rods as shown in each of FIGS. 2, 3 and 4.
Figure 3:
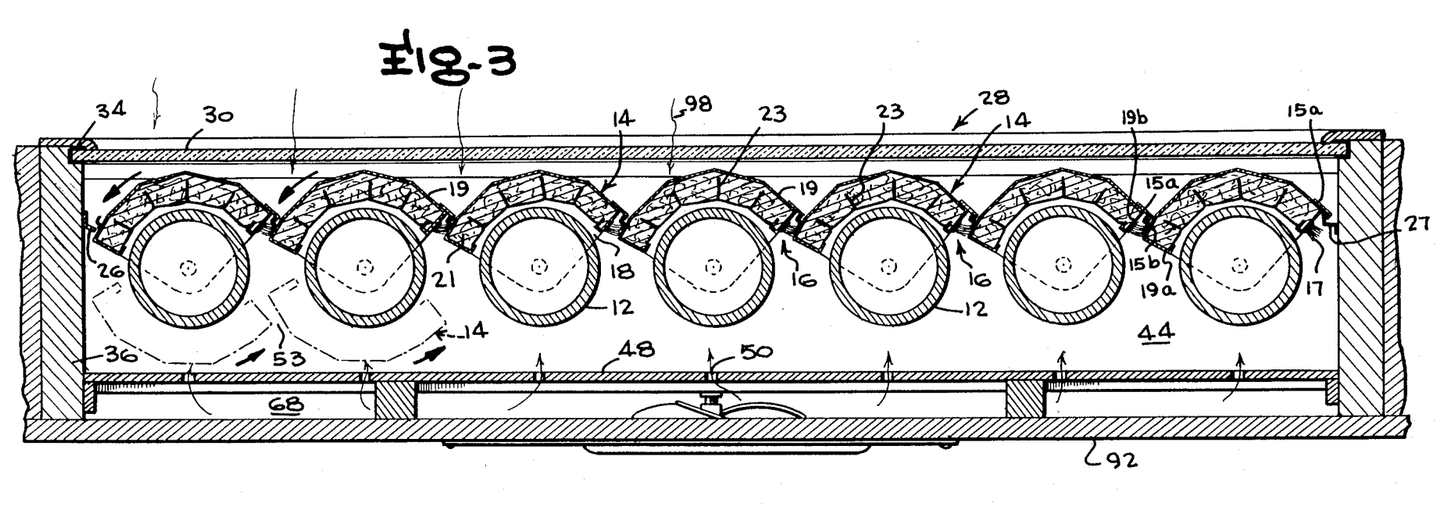
FIGS. 3 and 4 are sectioned views of the heat collector and storage system as taken along lines 3—3 and 4—4, respectively, as shown in FIG. 1.

Referring now to the drawings and in particular FIGS. 1, 2 and 3, there is shown a modular thermal collector and storage system 10 in accordance with the teachings of this invention, adapted to be disposed between an inside wall 92 and an outside wall 94 of the conditioned space, e.g. an interior room of a house. The modular heat collector and storage system 10 does not require the use of a window and, therefore, does not require insulating panels that must be moved periodically to prevent loss of heat from the housing's interior. The modular, heat collector and storage system 10 includes an enclosure 28 for mounting a plurality of energy storage rods 12 in an array as shown in FIG. 3. Each of the the energy storage rods 12 is filled with a phase change material and is sealed at its ends to contain the phase change material and prevent loss thereof when it liquifies. Illustratively, the ends of each rod 12 may be closed by fusing, gluing or welding an end cover thereover after the rod has been filled with the phase change material. In an illustrative embodiment of this invention, the phase change material may be an eutectic salt such as calcium chloride hexahydrate, which changes phase at approximately 81° F. thus giving up or absorbing its latent heat at that temperature. The phase change material can be selected from a variety of substances having its phase change or melting temperature high enough above desired room temperature to promote efficient convective and radiant heat transfer. In one embodiment of this invention, the energy storage rods were of the type manufactured by Pipe Systems, Inc. under their designation "Thermol 81 Energy Storage Rods."

Briefly in operation, the modular thermal collector and storage system operates to expose its energy storage rods 12 to absorb the solar energy as directed along arrows 98 during that period of day in which they may be exposed to the sun. At any time, a drive motor 60 may be energized to rotate a fan 58, whereby air is drawn from the conditioned space through an input register 56 and into an input baffle 42. The fan 58 drives the relatively cool air into an input chamber 68 defined by the inside or support wall 45 and a diffuser 48, before passing through openings 50 of the diffuser 48 to be directed substantially perpendicularly onto the energy storage rods 12. The energy storage rods 12 are disposed with a heat exchange chamber 44 and after the air passes over the rods 12 to be heated, it passes through an output register 54 and into the conditioned space.

Referring now to FIGS. 1 and 2, the enclosure 28 of the modular collector and storage system 10 is shown in greater detail as including a pair of side frame members 36 spaced from each other and interconnected by a bottom frame member 38 and a top frame member 40, suitably interconnected with each other to provide the rectangularly-shaped enclosure 28. The energy storage rods 12 are mounted, as will be explained in detail later, within a heat exchange chamber 44 as formed by a portion of the side frame members 36, a bottom divider panel 46 and the top frame member 40 disposed between the members 36. On that side of the heat exchange chamber 44 facing the conditioned space, there is disposed the diffuser 48 having a plurality of openings or slots 50 selectively spaced from each other to permit the flow of turbulated air therethrough to be directed substantially perpendicularly onto the energy storage rods 12. That side of the heat exchange chamber 44 opposite the diffuser 48, is formed by a glazing panel 30 that permits the solar energy as directed along arrows 98 (see FIGS. 2 and 3) to pass therethrough and to be absorbed by the energy storage rods 12. As particularly shown in FIG. 3, the glazing panel 30 is mounted by a frame having a recess 34 for receiving the edge of the glazing panel 30. As shown most clearly in FIG. 2, the heat exchange chamber 44 includes a portion 44' that is formed below the rods 12, by a lower part of the panel 30 and the support wall 45, whereby a further space is exposed to the incident solar energy as directed along arrows 98.

As shown more clearly in FIGS. 1 and 2, the enclosure 28 includes the input baffle 42 associated with the input register 56 to receive air from the conditioned space and to be directed by the fan 58 through the input chamber 68 and into the heat exchange chamber 44. The input baffle 42 is formed by the interior surface of the lower portion of the side frame members 36, the bottom frame member 38, the bottom divider panel 46, and the inside wall 92. The motor 60 drives the fan 58 whereby air is taken in through the input register 56 and driven through input baffle 42 and into the input chamber 68. The input chamber 68 is shown in FIGS. 2 and 3, as being defined by the middle portions of the side frame members 36, by the diffuser 48, at its top by the top frame member 40 and by the inside wall 92. The relatively cool air that is forced into the input chamber 68 is directed through the openings 50 into the heat exchange chamber 44 and onto the energy storage rods 12, whereby the air is heated in a manner to be explained.

As shown in FIGS. 3 and 5, each of the energy storage rods 12 is associated with its cooperating insulating member 14, which includes at either end of the rod 12 a support member 18 that is configured as a pie slice or sector and illustratively is affixed to opposite ends of its rod 12. Each of the insulating members 14 includes a backing member 19 configured as a plurality of straight segments as seen in FIGS. 3 and 5. At both ends of the backing member 19, there are disposed first and second channel-shaped members 19a and 19b, for retaining an insulating body 21. In an illustrative embodiment of this invention, each insulating body 21 is made of an isosyanaurate rigid foam material, and has a segmented configuration similar to that of the backing member 19 as formed by taking a flat panel of such material and by cutting a series of wedges therefrom, whereby the member 21 may be formed as a series of segments with slits 23 disposed therebetween, as shown in FIG. 3. The top end of the rod 12 is rotatably mounted about a support rod 83, whereas the bottom end of the rod 12 is rotatively driven by a drive rod 81 by a mechanism to be described. Each of the rods 12 and its cooperating insulating member 14 is rotatable counterclockwise from a first position as shown in full line in FIG. 3, to a second position as shown in dotted line in FIG. 3. Each of the insulating members 14 includes a seal 16 that is so configured and dimensioned to form with the insulating members 14 an interlocking, insulating layer extending across the rear portion of the heat exchange chamber 44 to prevent or to substantially retard the loss of heat energy from the rods 12, when the insulating members 14 are disposed in their first positions. In particular, each insulating member 14 has its insulating seal 16 made of a relatively flexible material so as to be readily compressible to effect a substantially complete insulating seal between adjacent insulating members 14, when they are disposed in their first or "in" position as shown in FIG. 3. Each seal 16 is made-up of two parts, the first comprising an extended length of a brush 16 disposed horizontally, as shown in FIG. 5, along the length of the end member 19b. A second part of each seal 16 is comprised of a pair of mating flanges 15a and b, as shown in FIG. 3 The mating flange 15a is substantially L-shaped and is mounted adjacent to the end member 19b in a manner to engage the mating flange 15b disposed on the end member 19a of a second insulating member adjacent to the first insulating member 14. The brush 17 and the mating flanges 15a and b act in concert to provide a substantially complete insulation seal. When the insulating members 14 are each disposed in their first positions as shown in FIG. 3, each insulating seal 16 will abut the adjacent member 14, whereby a continuous insulating layer or means is formed to prevent escape of the thermal energy as stored within the rods 12.

On both sides of the heat exchange chamber 44, as shown in FIG. 3, there are included flanges 26 and 27 fixedly mounted to its side frame member 36 to provide a sealing means with respect to the adjacent insulating member 14. As shown in FIG. 3, the mating flange 15a of the right-most insulating member 14 interlocks with the flange 27 to form a seal therebetween. In their second position, the insulating members 14 and in particular their insulating seals 16 do not contact each other but rather spaces 53 are left therebetween to permit heat to radiate therethrough and into the conditioned space.

The modular collector and storage system 10, as shown in FIG. 3, is in a preferred embodiment of this invention disposed in the outside wall 94 of a building in a manner to face south so that the right-most side frame member 36 is disposed toward the west and the left-most side frame member 36 is disposed toward the east. Assuming such an orientation, the sun appears in FIG. 3 to move from left-to-right in the course of the day, appearing first in the morning on the left-hand side of FIG. 3 and progressing toward the left side. It is understood that a southern orientation for the system 10 would provide the system with the highest degree of incident solar energy. As will be explained later, a mechanism is provided for moving and in particular rotating each insulating member 14 from its first position as shown in solid line in FIG. 3 in a counterclockwise direction through an arc of less than 180°. By not rotating the member 14 a full 180°, the spaces 53 are provided between adjacent insulating members when they are disposed in their second or "out" position. As particularly shown in FIG. 3, the insulating members 14 when they are disposed in their second position are offset or askew with respect to the axis of their storage rod 12 to favor the afternoon sun, i.e. the sun in the afternoon (as disposed on the right-hand side of FIG. 3) falls fully upon each of the storage rods 12 in contrast to the morning sun (on the left-hand side of FIG. 3) which is partially blocked or shadowed by an insulating member 14.

Figure 4:
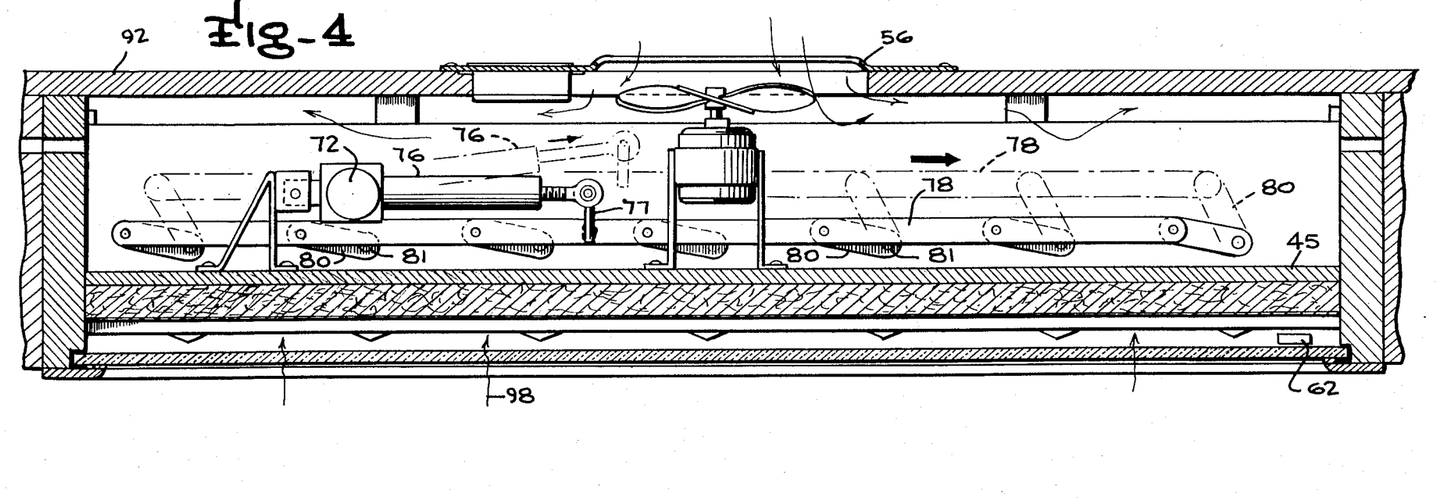

As shown in FIGS. 4 and 5, means for disposing the insulating members 14 and their insulating seals 16 between their first and second positions comprises an actuator 72 and a linkage mechanism as mounted within the input baffle 42. The actuator 72 may take the form of an electric, reversible actuating motor that is coupled to a drive member 78 by a translating mechanism 76. The actuator 72 is energized selectively as will be explained with respect to FIG. 6A to drive the drive member 78 in either direction. A plurality of lever arms 80, one for each of the energy storage rods 12 and cooperating insulating members 14, is pivotably connected to the drive member 78. In turn, the rotatable drive rod 81 is fixedly secured to its lever arm 80, whereby, upon the energization of the actuator 72, in a first mode the drive member 78 is driven from right to left as seen in FIG. 4, whereby, the insulating members 14 are rotated from their first position to their second position. It is understood that upon energization in the other mode, the actuator 72 moves the drive member 78 in the opposite direction thereby moving the energy storage rods 12 and their cooperating insulating member 14 from their second to first positions. The translating mechanism 76 as shown in FIGS. 4 and 5 is mounted upon a bracket 73 secured to the wall 45; the bracket 73 provides a pivotal mounting for the translating mechanism 76 to permit it to rotate from a first position shown in full line in FIG. 4 to a second position shown in dotted line in FIG. 4 thus permitting the drive member 78 to be directed from left-to-right and back again. The translating mechanism 76 responds to the rotational input of the actuator 72, a reversible motor, to impart a rectilinear motion to the threaded rod 74. As shown in FIG. 5, the threaded rod 74 is coupled by a coupling member 77 to the drive member 78 to impart a rectilinear motion thereto.

Figures 6A, 6B:
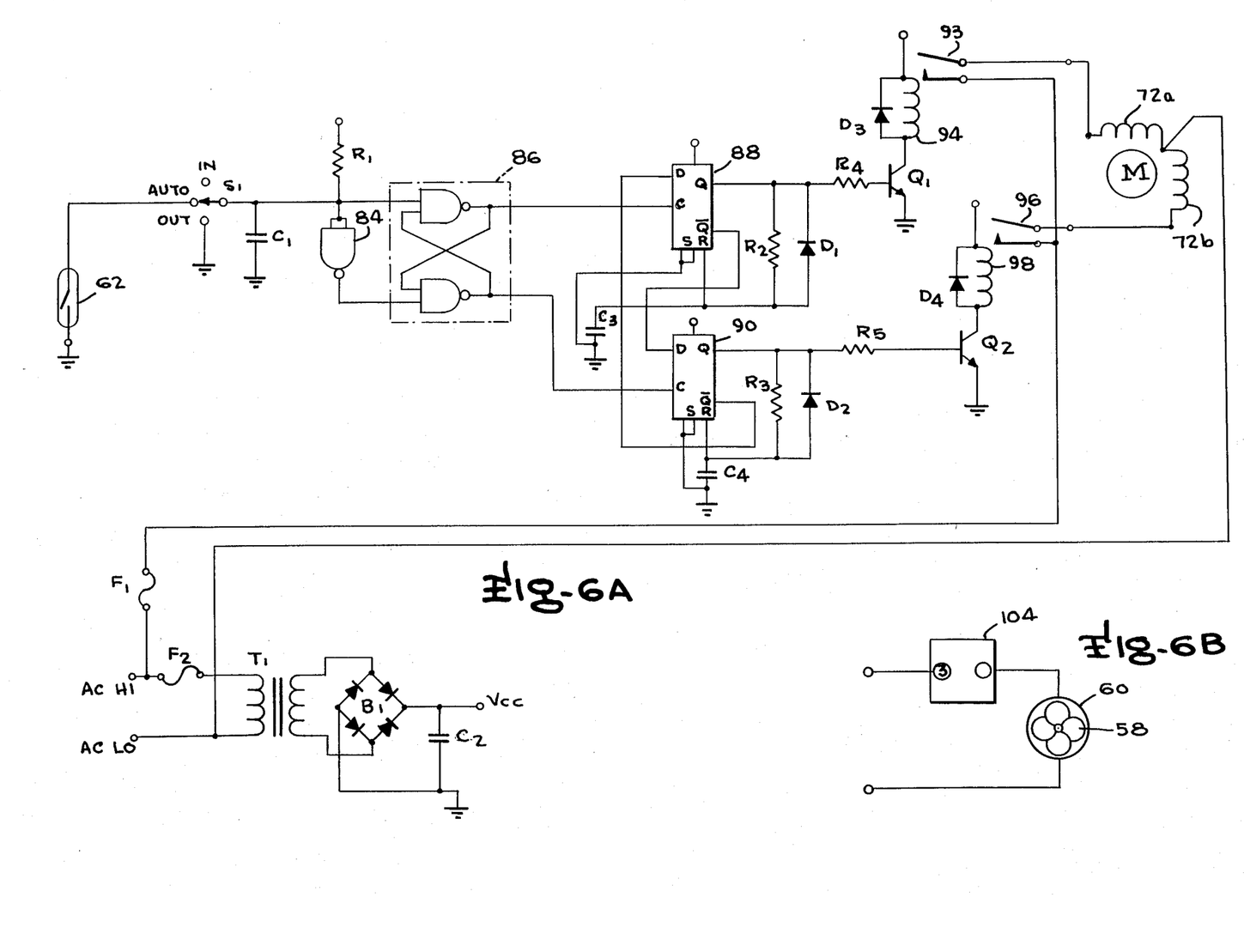
FIGS. 6A and 6B are detailed circuit diagrams of the control circuits for controlling the operation of the actuator for effecting movement of each of the insulating members between its first and second positions, and to drive the fan whereby air is drawn through the enclosure of the heat collector and storage system as shown in each of FIGS. 1, 2 and 3

The operation of the modular system 10 of this invention will now be more fully explained with respect to the circuits shown in FIGS. 6A and B. The selective release of the thermal energy stored in the rods 12 is controlled by a temperature control circuit 104, as shown in FIG. 6B that selectively energizes the motor 60 to drive the fan 68, whereby air is drawn through the heat exchange chamber 44 and reintroduced into the conditioned space through the output register 54. The temperature control circuit 104 includes a temperature sensitive element for measuring the temperature of the conditioned space, and in one illustrative embodiment of this invention, takes the form of a thermostat manufactured by Honeywell under their designation T651A. In operation, the temperature control circuit 104 senses the temperature within the conditioned space and when it falls below a given level, which may be variably set, the temperature control circuit 104 applies the AC power to energize the motor 60 whereby the fan 58 circulates air about and past the energy storage rods 12, whereby the air is heated and subsequently returned via the output register 54 to the conditioned space.

A control circuit for the actuator 72 is shown in FIG. 6A and in the illustrative embodiment shown, operates independently of the temperature control circuit 104. As shown in FIGS. 3 and 6A, the actuator control circuit includes a temperature sensitive element 62 that is disposed within the heat collection chamber 44' to sense the chamber temperature as heated by the input solar radiation. During those periods when solar energy is available, i.e. the chamber temperature rises above a first relatively high level, the actuator 72 is energized in a first mode, whereby the insulation members 14 are disposed in their second position to permit the sun's rays 98 to pass through the glazing panel 30 and the solar energy to be absorbed by the rods 12. When the chamber temperature as sensed by the temperature sensor 62 falls below a second level lower than the first level, the actuator 72 is energized in a second mode, whereby the energy storage rods 12 and their cooperating insulating members 14 are moved from their second to first position, wherein the insulating seals 16 form an insulating barrier to substantially reduce heat loss from the rods 12.

Referring now to FIG. 6A, there is shown a detailed circuit diagram for controlling the energization of the actuator 72 taking illustratively the form of a reversible actuating motor, in response to the temperature as sensed by the temperature sensor 62 placed within the heat collection chamber 44' as shown in FIG. 2. The actuator 72 includes a first energizing coil 72a which upon the closing of a solenoid switch 93, is energized to in turn energize the actuator 72 to drive the drive member 78 from left to right as shown in FIG. 4, whereby the energy storage rods 12 and their insulating members 14 are moved from their second to first positions. In the second mode, the coil 72b is energized upon the closing of a solenoid switch 96 by the AC power source to drive the drive member 78 from right to left as shown in FIG. 4, whereby the energy storage rods 12 and their insulating members 14 are driven from their second to first positions. The conventional AC source is selectively applied by the solenoid switches 93 and 96 to the actuating coil 72a and 72b, respectively. The AC source is also applied to the primary winding of a transformer T1, whose secondary winding serves to energize a diode bridge B1 whereby a voltage $V_{cc}$ is established across a capacitor C2 to energize the various logic elements of the circuit shown in FIG. 6A. In the first mode, the temperature sensor 62 senses the rise of the chamber temperature above the first level, e.g. 100° F., by closing to establish a circuit to ground whereby a low signal is applied through a switch S1, when disposed in its auto position to the input of a debounce flip-flop 86. The flip-flop 86 is comprised of two NAND gates 88 and 90 interconnected as shown in FIG. 6A, and is responsive to a low input to apply a high going signal to the clock input (C) of a first one-shot multiplier 88, which in turn provides a timing pulse of selected duration via the resistor R4 to the base of transistor Q1, which is rendered conductive to thereby energize the excitation coil 94, thus closing solenoid switch 93 and energizing the coil 72a. In this manner, the energy storage rods 12 and their associated cooperating insulating members 14 are disposed from their first to second positions, wherein the solar energy is directed through the panel 30 and onto the energy storage rods 12, whereby the input solar energy is collected and stored. The length of the timing pulse as provided from the Q output of the first one-shot multiplier 88 is determined by a timing circuit comprised of resistor R2 and capacitor C3. The diode D1 serves to permit a rapid discharge of the capacitor C3, when the circuit is operating in its second mode, as will be explained. The diode D3 is a clamping diode to prevent the collapsing EMF within the coil 94 from reclosing the solenoid switch 93.

In the second mode, as the chamber temperature falls below its second, lower level, e.g. 85° F., the temperature sensor 62 opens or breaks whereby a relatively high signal is applied to the debounce flip-flop 86. The high signal is inverted by an inverter 84 and applied to a second input of high signal is applied to the clock input (C) of a second one-shot multiplier 90, whereby its Q output goes high to provide a second timing pulse of a selected duration, e.g. 25-seconds, as determined by a second timing circuit comprised of resistor R3 and capacitor C4. The timing pulse is applied through a resistor R5 to the base of transistor Q2, which is rendered conductive to energize an excitation coil 98, thereby closing the solenoid switch 96 to energize the coil 72b and to actuate the actuator 72 in its second mode, whereby the energy storage rods 12 and their associated insulating members 14 are disposed from their second to first positions. It is understood that diodes D2 and D3 serve similar functions to those of diodes D1 and D3 described above. The $\overline{Q}$ output of one multiplier is connected to the D input of the other multiplier, whereby when one multiplier is triggered by the debounce flip-flop 86, the other one-shot multiplier is clamped in an opposite state to prevent the actuator 72 from being energized in both directions at the same time. The selection of first and second different temperatures for the closing and opening of the temperature sensor 62 prevents a possible unstable condition, wherein the energy storage rods 12 and corresponding insulating members 14 would be rapidly driven back and forth between the first and second positions. Further, it is understood that switch S1 may be disposed from its "auto" position to its "in" position whereby the storage rod 12 and the insulating members 14 are disposed in their first or "in"-'positions, and to its "out" position whereby the storage rods 12 and insulating members 14 are disposed to their second or "out" positions.

Thus, there has been shown and described a modular type thermal collector and storage system that may be incorporated into the exterior walls of a housing in a decorative and esthetic way without the necessity of mounting collector elements on the exterior of a housing or providing a relatively large, cumbersome and expensive heat storage unit or without requiring excessive amounts of south facing glass. The system of this invention provides a controllable, efficient system for collecting and storing heat during the sunlit portions of the day and then, at nighttime, for selectively releasing that stored energy into the conditioned space when the conditioned space temperature has fallen below a given level.

In considering this invention, it should be remembered that the present disclosure is illustrative only and the scope of the invention should be determined by the appended claims.

I claim:

1. Thermal collector and storage apparatus adapted to be disposed within a wall defining at least in part a conditioned space to be heated by solar energy, said apparatus comprising:
   (a) enclosure means having an opening to permit solar rays to pass therethrough and a heat exchange chamber;
   (b) a plurality of energy storage elements supported by said enclosure means within said heat exchange chamber for receiving said solar rays, each energy storage element containing a phase change material selected to have a solid to liquid transition at a temperature sufficiently above the desired interior housing temperature to permit efficient heat transfer to the conditioned space and a high heat of fusion associated with said transition, said plurality of energy storage elements is disposed in an array with each of said energy storage elements parallel to its adjacent energy storage element, and
   (c) a plurality of heat insulating members, each heat insulating member being associated with a corresponding energy storage element and mounted for movement between a first position, wherein said heat insulating members are disposed between said opening and said plurality of energy storage elements to retard heat loss from said energy storage elements, and a second position wherein the solar rays are permitted to be directed through said opening and onto said plurality of heat energy storage elements, each of said plurality of heat insulating members is configured so that when they are disposed in their second positions there is provided a space between adjacent heat insulating members to permit the solar rays to be directed through said spaces and, thus, directly radiate heat throughout said heat exchange chamber, adjacent of said insulating members of said plurality are adapted to mate with each other when disposed in their first position to form a substantially continuous insulating barrier between said plurality of energy storage elements and said opening, each of said heat insulating members having at least one leading edge adapted to mate in a heat sealing relationship with an adjacent one of said heat insulating members, when said heat insulating members are disposed to their first positions.

2. Thermal collector and storage apparatus adapted to be disposed within a wall defining at least in part a conditioned space to be heated by solar energy, said apparatus comprising:
   (a) enclosure means having an opening to permit solar rays to pass therethrough and a heat exchange chamber;
   (b) a plurality of energy storage elements supported by said enclosure means within said heat exchange chamber for receiving said solar rays, each energy storage element containing a phase change material selected to have a solid to liquid transition at a temperature sufficiently above the desired interior housing temperature to permit efficient heat to transfer to the conditioned space and a high heat of fusion associated with said transition;
   (c) a plurality of heat insulating members, each heat insulating member being associated with a corresponding energy storage element and mounted for rotational movement about its corresponding energy storage element between a first position, wherein said heat insulating members are disposed between said opening and said plurality of energy storage elements to retard heat loss from said energy storage elements, and a second position wherein the solar rays are permitted to be directed through said opening and onto said plurality of heat energy storage elements, and each of said plurality of heat insulating members is configured so that when they are disposed in their second positions there is provided a space between adjacent heat insulating members to permit the solar rays to be directed through said spaces and, thus, directly radiate heat throughout said heat exchange chamber, each of said plurality of heat insulating members disposed to form a like plurality of spaces between corresponding ones of said heat insulating members and said energy storage elements; and
   (d) air directing means for directing relatively cool air from the conditioned space into said enclosure means to be directed through said plurality of spaces to be conditioned by the energy stored by said plurality of energy storage elements before being directed back into the conditioned space.

3. The apparatus as claimed in claim 2, wherein adjacent insulating members of said plurality are adapted to mate with each other when disposed in their first position to form a substantially continuous insulating barrier between said plurality of energy storage elements and said opening.

4. The apparatus as claimed in claim 3, wherein said plurality of energy storage elements is disposed in an array with each of said energy storage elements parallel to its adjacent energy storage element, each of said heat insulating members having at least one leading edge adapted to mate in a heat sealing relationship with an adjacent one of said heat insulating members, when said heat insulating members are disposed to their first positions.

5. Thermal collector and storage apparatus adapted to be disposed within a wall defining at least in part a conditioned space to be heated by solar energy, said apparatus comprising:
   (a) enclosure means having an opening to permit solar rays to pass therethrough;
   (b) a plurality of energy storage elements supported by said enclosure for receiving said solar rays, each energy storage element containing a phase change material selected to have a solid to liquid transition at a temperature sufficiently above the desired interior housing temperature to permit efficient heat transfer to the conditioned space and a high heat of fusion associated with said transition;
   (c) a plurality of heat insulating members, each heat insulating member being associated with a corresponding energy storage elements and mounted for rotational movement about its corresponding energy storage element between a first position, wherein said heat insulating members are disposed between said opening and said plurality of energy storage elements to retard heat loss from said energy storage elements, and a second position wherein the solar rays are permitted to be directed through said opening and onto said plurality of heat energy storage elements, each of said plurality of heat insulating members being spaced from its corresponding energy element to permit circulation of a heat transfer medium therebetween, whereby the efficiency of heat transfer from said energy storage element is enhanced; and (d) actuator means coupled to each of said plurality of heat insulating members and energized to move each of said heat insulating members between its first position and its second position.

6. The apparatus as claimed in claim 5, wherein there is further included air directing means for directing relatively cool air from the conditioned space into said enclosure means to be directed through the spaces between said heat insulating members and about said energy storage elements to be heated by the energy stored by said plurality of energy storage elements before being directed back into the conditioned space.

7. The apparatus as claimed in claim 6, wherein said enclosure means comprises a heat exchange chamber for receiving said plurality of energy storage elements, said heat exchange chamber comprising a diffuser having a plurality of openings for directing the relatively cool air drawn from the conditioned space along paths substantially perpendicular onto said plurality of energy storage elements.

8. Thermal collector and storage apparatus adapted to be disposed within a wall defining at least in part a conditioned space to be heated by solar energy, said apparatus comprising:

(a) enclosure means having an opening to permit solar rays to pass therethrough;

(b) a plurality of energy storage elements supported by said enclosure for receiving said solar rays, each energy storage element containing a phase change material selected to have a solid to liquid transition at a temperature sufficiently above the desired interior housing temperature to permit efficient heat transfer to the conditioned space and a high heat of fusion associated with said transition;

(c) a plurality of heat insulating members, each heat insulating member being associated with a corresponding energy storage element and mounted for rotational movement about its corresponding energy storage element between a first position, wherein said heat insulating members are disposed between said opening and said plurality of energy storage elements to retard heat loss from said energy storage elements, and a second position wherein the solar rays are permitted to be directed through said opening and onto said plurality of heat energy storage elements, each of side plurality of heat insulating members being spaced from its corresponding energy element to permit circulation of a heat transfer medium therebetween, whereby the efficiency of heat transfer from said energy storage element is enhanced;

(d) actuator means coupled to each of said plurality of heat insulating members and energizable to move each of said heat insulating members from its first position to its second position; and (e) a first temperature sensor device disposed within said enclosure means for sensing the temperature within said enclosure means above a predetermined level for providing a first output, whereby said actuator means is energized and each of said plurality of insulating members is disposed to its second position to permit the solar rays to impact directly upon said energy storage elements.

9. The apparatus as claimed in claim 8, wherein there is included air directing means for directing relatively cool air from the conditioned space to be heated by said plurality of energy storage elements and, thereafter, to direct the heated air back to the conditioned space and a second temperature sensor element responsive to the temperature of the conditioned space for providing a second output, whereby said air directing means is energized.

10. The apparatus as claimed in claim 8, wherein said first temperature sensor device is responsive to the solar ray temperature below a second predetermined level lower than said first mentioned level, for providing a second output, whereby said actuator is energized and each of said plurality of insulating members is disposed to its first position.

* * * * *